US006348128B1

(12) United States Patent
Tran et al.

(10) Patent No.: US 6,348,128 B1
(45) Date of Patent: *Feb. 19, 2002

(54) METHOD OF INCREASING THE CAUSTICIZING EFFICIENCY OF ALKALINE PULPING LIQUOR BY BORATE ADDITION

(75) Inventors: Honghi N. Tran, Toronto (CA); Charles M. Bair, Thousand Oaks; Robert B. McBroom, Santa Clarita, both of CA (US)

(73) Assignee: U.S. Borax Inc., Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/275,577

(22) Filed: Mar. 24, 1999

Related U.S. Application Data

(63) Continuation-in-part of application No. 09/238,828, filed on Jan. 28, 1999, now Pat. No. 6,294,048
(60) Provisional application No. 60/087,779, filed on Jun. 1, 1998.

(51) Int. Cl.[7] ............................ D21C 11/00; D21C 11/04
(52) U.S. Cl. .......................... 162/29; 162/32; 162/37; 162/38; 162/80; 162/82; 162/90
(58) Field of Search .......................... 162/29, 30.1, 37, 162/38, 30.11, 90, 36, 80, 79, 32, 35, 82

(56) References Cited

U.S. PATENT DOCUMENTS

| 2,146,093 A | 2/1939 | Ritchie et al. |
| 3,766,001 A | 10/1973 | Gleason et al. |
| 3,865,684 A | 2/1975 | Gleason et al. |
| 4,116,759 A | 9/1978 | Janson |
| 4,248,662 A | 2/1981 | Wallick |

FOREIGN PATENT DOCUMENTS

| CA | 1087355 | 10/1980 |
| EP | 0 369 650 A2 | 5/1990 |
| FI | 66033 | 12/1982 |
| JP | 57161-189 | 3/1981 |
| SU | 1624082 A1 | 1/1991 |
| SU | 1601258 A1 | 10/1991 |

OTHER PUBLICATIONS

Emile Carriere, Henri Guiter and Francis Thubert, "The Action of Boric Anhydride on Sodium Carbonate", Chemical Abstracts, vol. 44, No. 3828 (1950).

Emile Carriere, Henri Guiter and Francis Thubert, "Action de l'anhydride borique sur le carbonate de sodium", Bull. Soc. Chim. France, 5, 16, p. 796–801 (1949).

Janson,Jan, "The use of unconventional alkali in cooking and bleaching; Part 1. A new approach to liquor generation and alkalinity", Paperi ja Puu–Papper och Tra, vol. 59, No. 6–7,pp. 425–430,1977.

(List continued on next page.)

Primary Examiner—Steve Alvo
(74) Attorney, Agent, or Firm—Kurt R. Ganderup

(57) ABSTRACT

A method is provided for improving causticizing efficiency in the conventional lime recausticization portion of an alkaline pulping process. Such processes are commonly used in the pulping and bleaching of wood and non-wood cellulose fiber materials. The method of this invention comprises reacting an aqueous solution of sodium carbonate with lime to produce sodium hydroxide (causticization) in the presence of borate in order to improve the causticization reaction efficiency. Borate is added in an amount sufficient to provide a boron to sodium (B/Na) molar ratio in the range of between about 0.001:1 and 0.4:1, and preferably in the range of between about 0.01:1 and 0.3:1, which results in an increased causticization efficiency of up to 8% over the reaction efficiency obtained in the absence of borate.

15 Claims, 4 Drawing Sheets

OTHER PUBLICATIONS

Janson,Jan & Pekkala,Osmo, "The use of unconventional alkali in cooking and bleaching; Part 2. Alkali cooking of wood with the use of borate", Paperi ja Puu–Papper och Tra,vol. 59,No. 9,pp. 546–557,1997.

Janson,Jan & Pekkala, Osmo, "The use of unconventional alkali in cooking and bleaching; Part 3. Oxygen–alkali cooking and bleaching with the use of borate",Paperi ja Puu–Papper och Tra, vol. 60,No. 2, pp. 89–93, 1978.

Janson,Jan,"The use of unconventional alkali in cooking and bleaching; Part 4. Kraft Cooking with the use of borate", Paperi ja Puu–Papper och Tra, vol. 60, No. 5, pp. 349–357, 1978.

Janson,Jan,"The use of unconventional alkali in cooking and bleaching; Part 5. Autocausticizing reactions", Paperi ja Puu–Papper och Tra, vol. 61, No. 1, pp. 20–30, 1979.

Janson,Jan,"The use of uncoventional alkali in cooking and bleaching;Part 6. Autocausticizing of sulfur–containing model mixtures & spent liquors",Paperi ja Puu–Papper och Tra,vol. 61, No. 2, pp. 98–103, 1979.

Janson,Jan,"Autocausticizing alkali and its use in pulping and bleaching", Paperi ja Puu–Papper och Tra, vol. 61, No. 8, pp. 495–504, 1979.

Markham,L.D.,"Use of Borax in Oxygen Pulping", Trans. Tech. Sect. Canadian Pulp Paper Assoc., vol. 4, No. 4, Tr/110–115, 1978.

Janson,J., "Pulp processes based on autocausticizable borate", Svensk Papperstidning, Finnish Pulp and Paper Institute, Finland, vol. 83, No. 14, pp. 392–395, 1980.

"An evolution of nonconventional causticizing technology for kraft chemical recovery", A Progress Report to Members of the Institute of Paper Chemistry, Institute of Paper Chemistry, Appleton, Wisconson, pp. 1–66, Jan. 30, 1981.

Janson,Jan and Arhippainen, Bengt, "Mill scale development of the borate–based kraft pulping process", International Conference on Recovery Pulping Chemistry, Vancouver, BC, Canada,pp. 205–210, 1981.

Kinzer, K., "Wood Pulping with self–causticizing borate", Chemical Abstracts, vol. 100, 23687b, 1983.

Kinzer,K., "Untersuchngnen zum HolsaufschloB mit selbstkaustizierndem Borat", Zellstoff und Papier, vol. 32, No. 5, pp. 202–207, 1983, (with Translation–"Investigation into Wood Decompostion with Autocausticizing Borate").

Sozen,G. and Pinder,K., "The autocausticizing of sodium carbonate with colemanite", Chemical Abstracts, vol. 107, 136139n, 1985.

Sozen,G. and Pinder, K., "The autocausticizing of sodium carbonate with colemanite", Appl.Chem.Eng.Princ.For.Prod.Relat.Ind., (Pap. Symp.), Am.Inst.Chem.Eng.,Forest Prod. Div., Tacoma,WA,vol. 1, pp. 9–20, 1986.

Janson,Jan and Soderhjelm, Liva, "The viscosity of borate–containing black liquor", Nordic Pulp and Paper Research Journal, No. 2, pp. 107–110, 1988.

Koran, Christine; Wandelt, Pawel; and Kubes, George J., "The effect of temperature on borate–based kraft cooking of black spruce", Chemical Abstracts, vol. 126; 90882m, 1985.

Koran, Christine; Wandelt, Pawel; and Kubes, George J., "The effect of temperature on borate–based kraft cooking of black spruce", Paperi ja Puu–Paper and Timber, vol. 78, No. 9, pp. 541–544, 1996.

Prihoda, Susanne; Wandelt, Pawel; and Kubes, George J., "The effect of borates on kraft, kraft–AQ and soda–AQ cooking of black spruce".

Tran, Honghi; Mao, Xiaosong; Cameron, John; and Bair, Charles M., "Autocausticizing of smelt with sodium borates", Int. Chem. Recovery Conf., Toronto, Canada, Tappi Press, Atlanta, Georgia, vol. 2, p. 841–852, Jun. 1, 1998.

Tran, Honghi; Mao, Xiaosong; Cameron, John; and Bair, Charles M., "Autocausticizing fo smelt with sodium borates", Chemical Abstracts vol. 129, 277541d, 1998.

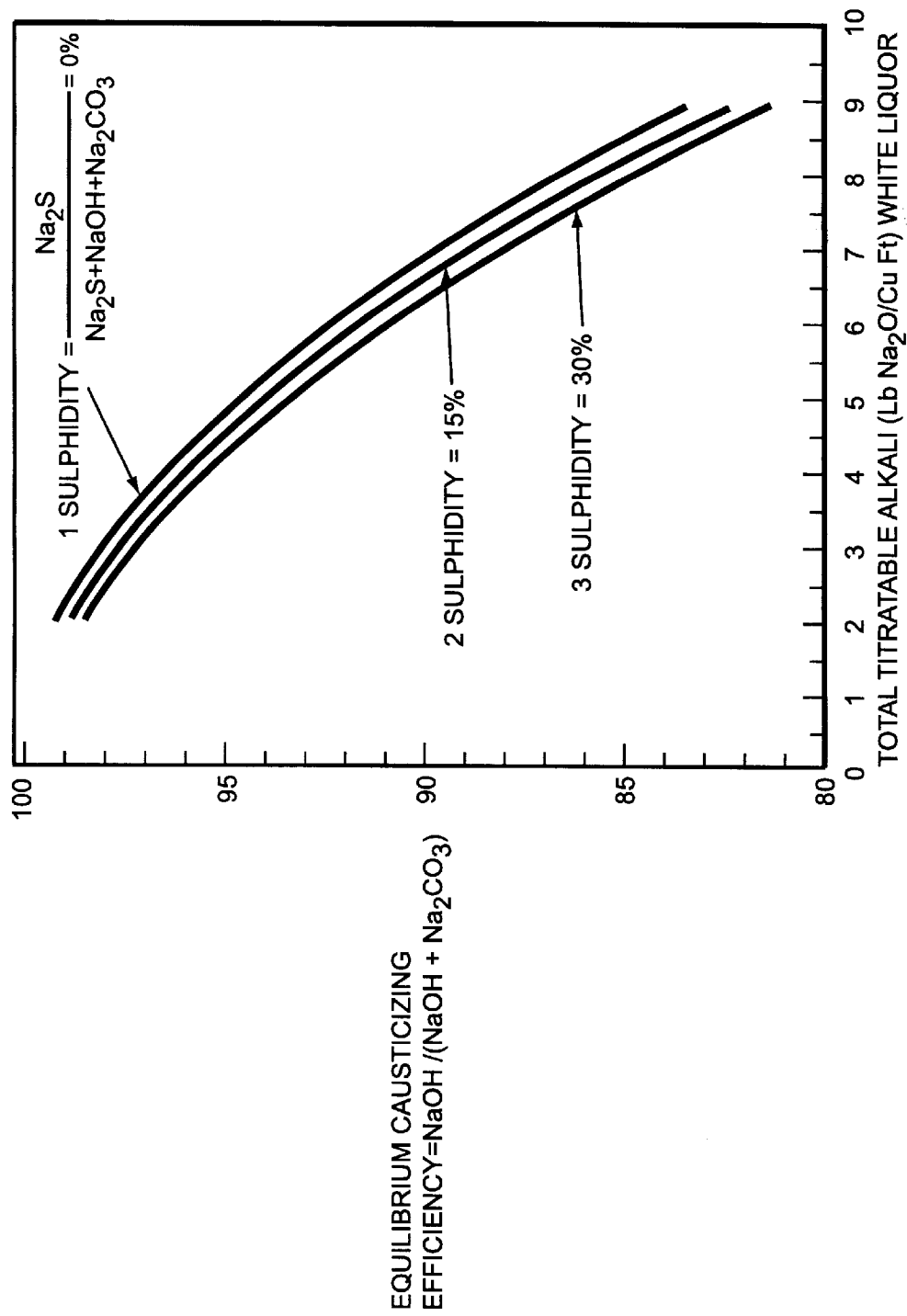
Fig. 1 Equilibrium CE as a function of TTA and sulphidity

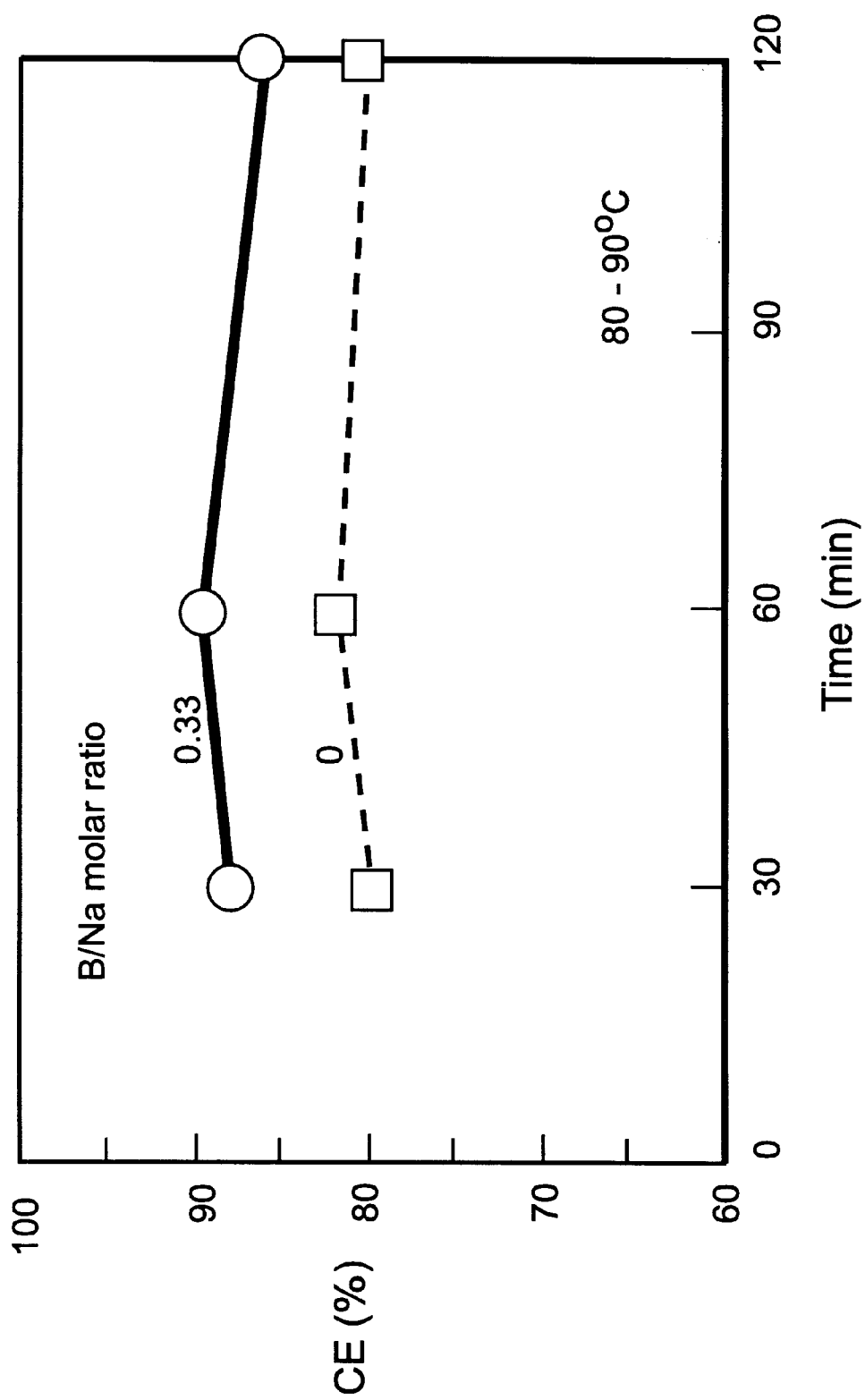
Fig.2 Causticizing Efficiency of Pure Na₂CO₃ Solution

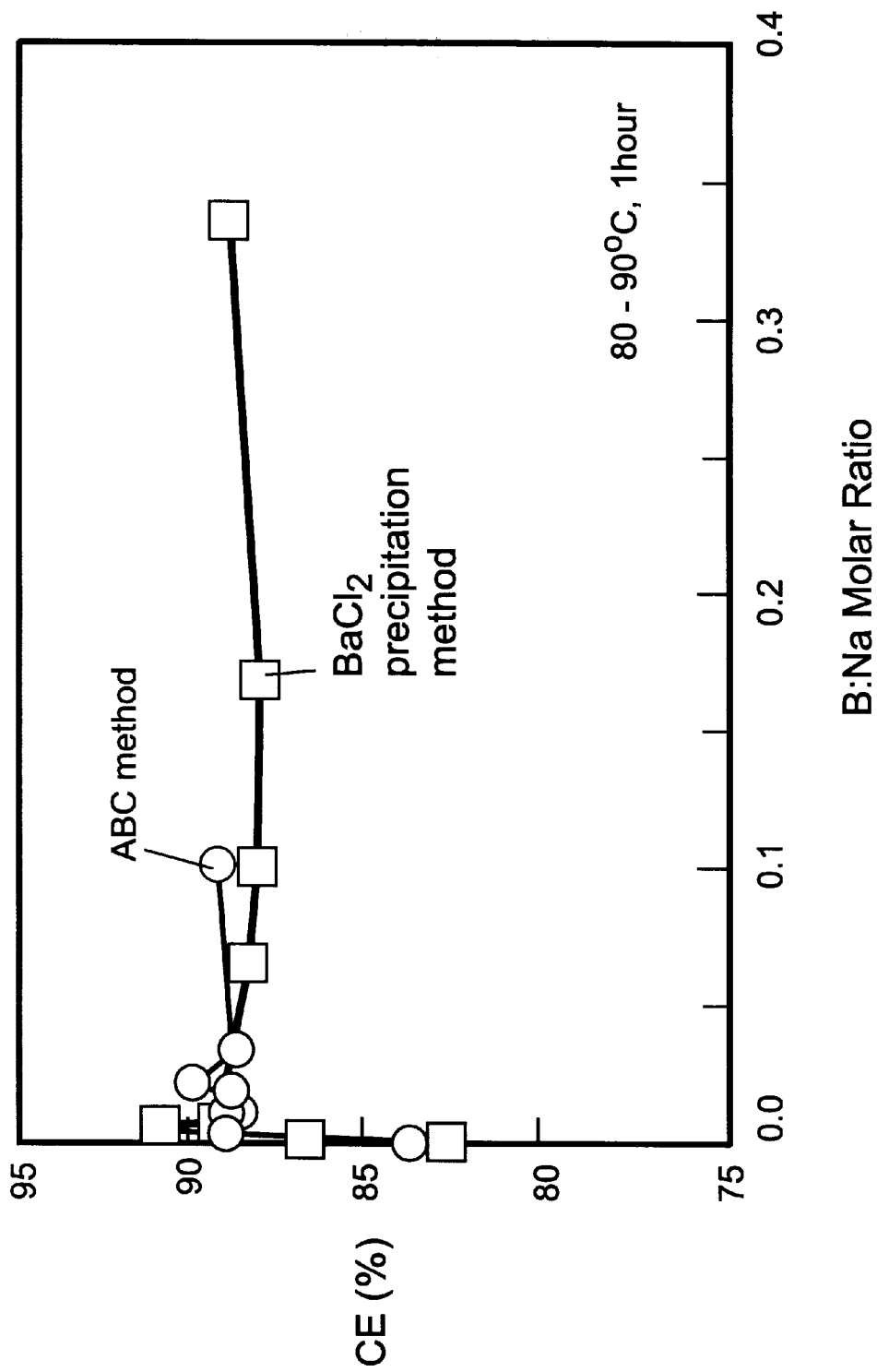

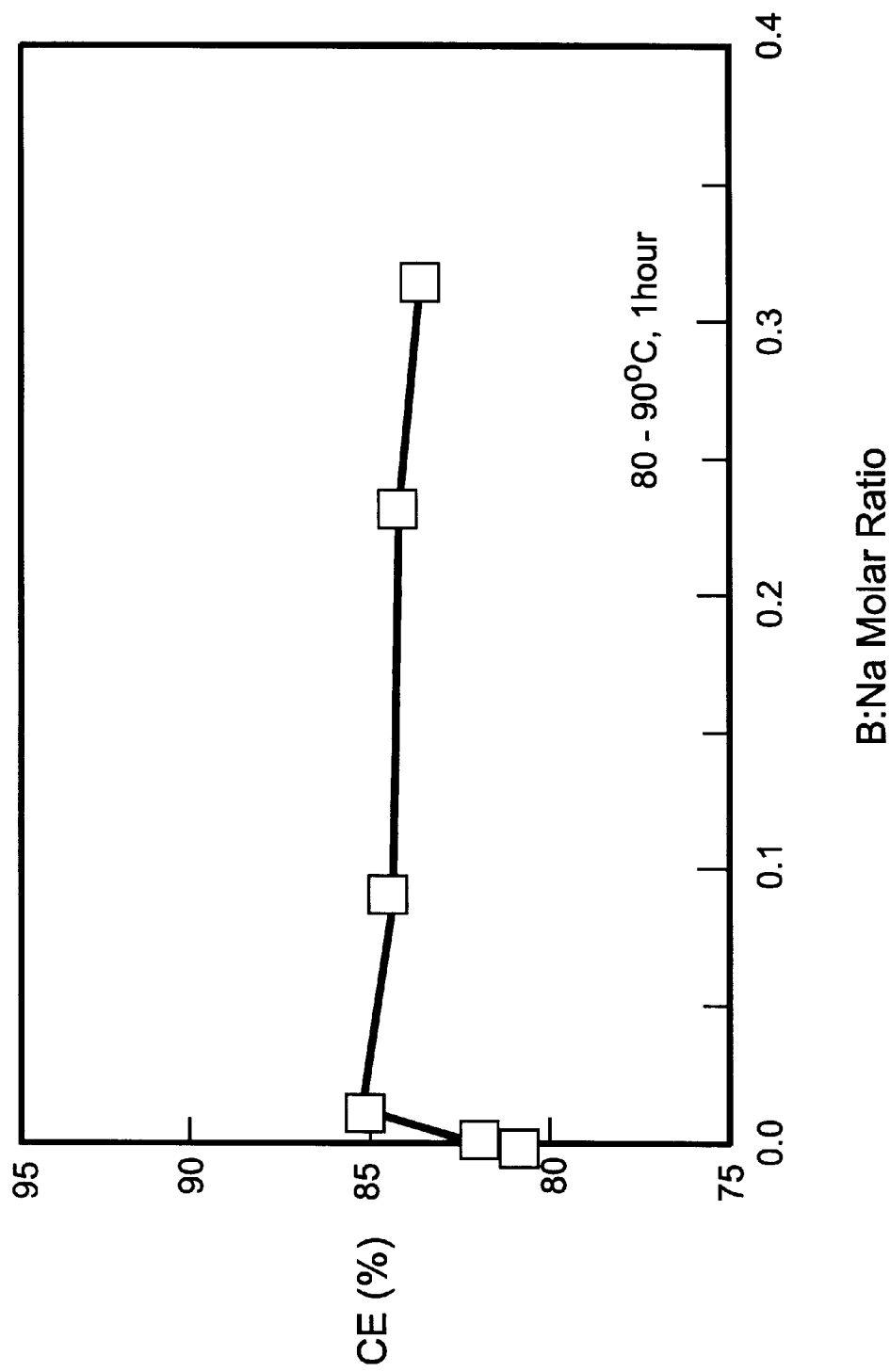
Fig. 4 Effect of Borate on CE of Smelt Solution

METHOD OF INCREASING THE CAUSTICIZING EFFICIENCY OF ALKALINE PULPING LIQUOR BY BORATE ADDITION

This Application is a continuation in part of U.S. Ser. No. 09/238,828, filed Jan. 28, 1999, now Pat. No. 6,294,048 which in turn claims the benefit of U.S. Provisional Application No. 60/087,779 filed Jun. 1, 1998.

This invention relates to the use of borates in the recausticization of alkali-containing liquors such as are produced in alkali pulping and bleaching processes for wood and non-wood cellulose fiber materials, and more particularly to a method for improving causticizing efficiency in a conventional lime recausticization process through the addition of borate.

BACKGROUND OF THE INVENTION

There exist a variety of processes which utilize alkali-based chemicals such as sodium hydroxide in the pulping, bleaching or oxidation of wood and non-wood cellulose-based materials (See Kirk-Othmer, "Encyclopedia of Chemical Technology", Fourth Edition, Volume 20, Pages 493–582). In the conventional alkaline pulping process, white liquor, an aqueous solution of sodium hydroxide (NaOH) and in many cases sodium sulfide ($Na_2S$), is used as cooking liquor to separate the fibers from wood chips in a high-temperature pressurized digester. The spent chemicals are recovered by filtering the pulp, evaporating/concentrating the filtrate (black liquor), burning the concentrated black liquor in a recovery furnace, and causticizing the resulting inorganic residue (smelt) in a causticizing plant to recover sodium hydroxide for re-use at the beginning of the process.

In a conventional causticizing plant, lime is reacted with an aqueous sodium carbonate solution (green liquor) to regenerate sodium hydroxide (white liquor). The lime causticizing process is carried out through three major steps: i) dissolving smelt from the recovery boiler with water in a dissolving tank to produce green liquor that consists of mostly sodium carbonate ($Na_2CO_3$) and $Na_2S$, ii) converting the green liquor into white liquor by causticizing it with lime (CaO) in a slaker, clarifiers and a series of causticizers, and iii) drying and calcining the precipitated lime mud ($CaCO_3$) in a lime kiln to produce CaO which is then reused. The reactions involved are as follows:

Lime Slaking: $CaO(s) + H_2O(l) \rightarrow Ca(OH)_2(s)$

Causticizing: $Na_2CO_3(aq) + Ca(OH)_2(s) \rightleftharpoons 2\ NaOH(aq) + CaCO_3(s)$ Lime Burning: $CaCO_3(s) \rightarrow CaO(s) + CO_2(g)$ There is an inherent problem in the causticizing operation. The causticizing reaction can never go to completion (or 100% reaction), but rather, approaches equilibrium which can be described by the following equation:

$$K = \frac{f_{OH^-}^2 \cdot [OH^-]^2}{f_{CO_3^{2-}} \cdot [CO_3^{2-}]} = \frac{[OH^-]^2}{[CO_3^{2-}]} = \frac{f_{OH^-}^2 \cdot [Ca^{2+}][OH^-]^2}{f_{CO_3^{2-}} \cdot [Ca^{2+}][CO_3^{2-}]}$$

or $$K = \frac{f_{OH^-}^2}{f_{CO_3^{2-}}} \times \frac{K_{SP-Ca(OH)_2}}{K_{SP-CaCO_3}}$$

where K is the apparent equilibrium constant, $f_{OH^-}$ and $f_{CO_3^{2-}}$ are respectively the dimensionless activity coefficient of $OH^-$ ions and $CO_3^{2-}$ ions, and $K_{SP}$–$Ca(OH)_2$ and $K_{SP}$–$CaCO_3$ are respectively the solubility constant of $Ca(OH)_2$ and $CaCO_3$.

In pulp mills, the degree of completion of the causticizing reaction or causticizing efficiency (CE) is customarily defined as $$CE = \frac{[NaOH]}{[NaOH] + [Na_2CO_3]} \times 100\%$$

where [NaOH] and [$Na_2CO_3$] are respectively the concentration of NaOH and $Na_2CO_3$ in the liquor, in mol/L, or in g/L (or Lb/ft$^3$) of $Na_2O$. The equilibrium causticizing efficiency is strongly affected by the liquor strength (total titratable alkali or TTA), the hydroxide concentration (active alkali or AA), the sulfide concentration (sulfidity), and to a smaller extent, the liquor temperature. As shown in FIG. 1, the equilibrium causticizing efficiency decreases markedly from 99% for a dilute solution with a TTA of 2 Lb/ft$^3$ $Na_2O$ and 0% sulfidity, to 82% for a concentrated solution of 9 Lb/ft$^3$ $Na_2O$ TTA and 30% sulfidity.

The equilibrium causticizing efficiency curves in FIG. 1 (from "Pulp & Paper Manufacture, 3$^{rd}$ Edition, Volume 5, Alkaline Pulping", page 568, TAPPI/CPPA, 1989) serve only as a limit for the maximum possible conversion efficiency. In practice, however, the conversion from $Na_2CO_3$ to NaOH is lower since it is also controlled by the reaction kinetics. The reaction usually proceeds rapidly in the beginning, then becomes very sluggish after 20 to 30 minutes because of two main reasons: i) as the concentration of $OH^-$ ions increases with time, the reaction equilibrium tends to shift to the left, and ii) as the reaction proceeds, the surface of $Ca(OH)_2$ particles becomes covered with precipitated $CaCO_3$, which hinders the diffusion of $CO_3^{2-}$ ions from the solution to the core of $Ca(OH)_2$ particles. Due to the equilibrium and kinetic effects, causticizing efficiency is greatly also affected by the liquor temperature, retention time, lime-to-green liquor ratio and lime quality.

The causticizing efficiency of white liquor in kraft pulp mills is typically about 81%, varying from 78 to 83%. Thus, for every kg of NaOH required for the cooking process, there will be approximately 0.23 kg of unreacted or "useless" $Na_2CO_3$ circulating in the liquor. This large amount of carbonate deadload necessitates the use of a higher volume of white liquor per unit of wood chips, thus decreasing the production capacity of the wood pulping circuit.

An alternative method of recausticization which does not require the use of lime and the associated lime recovery process but does involve the use of borate was developed in the 1970's by Jan Janson, a researcher in Finland (U.S. Pat. No. 4,116,759). Janson proposed that sodium carbonate in the smelt could be causticized automatically ("autocausticized") in the recovery boiler by the addition of borate to the wood pulping circuit, thus eliminating the need for subsequent recausticization by calcium hydroxide and the accompanying lime recovery circuit. However, it was suggested that conventional causticizing with lime is counteracted by the presence of borate and that these alternative methods of causticization were therefore not compatible with each other and could not be combined (Jan Janson, "Autocausticizing alkali and its use in pulping and bleaching", Paperi ja Puu, 61, #8, p. 502, 1979).

RELATED APPLICATION

Applicants' copending application Ser. No. 09/238,828 describes and claims an improved method for regeneration of sodium hydroxide through which smelt is autocausticized at a high rate of efficiency in the recovery boiler by the addition of a limited amount of borate such that the mole ratio of boron to carbonate is less than 2:1 and the mole ratio of sodium to boron is greater than 3:1. Sodium hydroxide is then regenerated in solution when the borate-autocausticized smelt is dissolved. Application Ser. No. 09/238,828 also discloses a process wherein sodium hydroxide is regenerated by a combination of partial autocausticization with borate followed by conventional causticization of unreacted sodium carbonate with lime.

BRIEF SUMMARY OF THE INVENTION

The present invention provides a method for improving the causticizing efficiency of an alkaline pulping liquor. In particular it relates to a method for improving the efficiency of converting sodium carbonate to sodium hydroxide by reaction with lime in the presence of borate.

BRIEF DESCRIPTION OF THE DRAWINGS

FIG. 1 is a graph of the equilibrium causticizing efficiency of white liquor as a function of total titratable alkali at various levels of sulfidity.

FIG. 2 is a graph of causticizing efficiency of a pure sodium carbonate solution as a function of time in the presence of and in the absence of boron at 80–90° C., based on the results of Example 1.

FIG. 3 is a graph of the effect of borate on causticizing efficiency (CE) of a pure sodium carbonate solution as a function of the boron to sodium molar ratio at 80–90° C. for one hour, based on the results of Example 2.

FIG. 4 is a graph of the effect of borate on causticizing efficiency (CE) of a smelt solution as a function of the boron to sodium molar ratio for causticization at 80–90° C. for one hour, based on the results of Example 3.

DETAILED DESCRIPTION OF THE INVENTION

The method of this invention comprises reacting an aqueous solution of sodium carbonate with lime to produce sodium hydroxide (causticization) in the presence of borate in order to improve the causticization reaction efficiency. In particular, borate is added in an amount sufficient to provide a boron to sodium (B/Na) molar ratio in the range of between about 0.001:1 and 0.4:1, preferably in the range of 0.003:1 and 0.33:1, and more preferably in the range of between about 0.01:1 and 0.3:1, which results in an increased causticization efficiency of up to 8% over the reaction efficiency obtained in the absence of borate.

This method can be use in alkaline pulping processes where conventional lime causticizing is used to regenerate sodium hydroxide from sodium carbonate. It is applicable in the presence of sodium sulfide and sulfate, as well as in processes which do not contain sulfide or sulfate. Such processes include the conventional kraft process, the soda process, and bleaching or oxidizing processes involving either wood or non-wood cellulose-based materials.

The efficiency of the reaction of sodium carbonate with lime to regenerate caustic soda is limited by chemical equilibria and kinetics such that causticizing efficiency is typically in the range of about 78 to 83%. The method of this invention can increase the causticizing efficiency in an alkaline pulping process from about 81% up to about 89%. This increase is believed to derive at least in part from the buffering action of sodium metaborate ($NaBO_2$) in an alkaline solution to suppress the hydroxyl ion concentration at or near the surface of $Ca(OH)_2$ particles, allowing the equilibrium of the causticizing reaction to shift to the right, thereby increasing the causticizing efficiency.

Borate can be added to the pulping process in a variety of inorganic borate forms including boric acid, boric oxide, and sodium borates such as sodium tetraborate and sodium metaborate and the various hydrated forms thereof. Due to the sodium content and alkalinity requirements of pulping processes, sodium borates such as sodium tetraborate and sodium metaborate are preferred. Borate is not consumed in the pulping process. Under typical conditions the borate would be retained and recirculated in the process. Therefore, once the desired steady state level of borate has been established in the pulping process, additional borate is added only as needed to replace borate losses from the process.

The beneficial effect of borate on causticizing efficiency occurs both with and without the presence of sulfur compounds, such as sodium sulfide, in the system. The percent causticizing efficiency in pulping circuits is typically in the low 80's. In the presence of sulfide, the addition of borate at a level sufficient to provide a boron to sodium (B/Na) molar ratio in solution in the range of between about 0.01:1 and 0.3:1 results in an improvement in causticizing efficiency of at least about 3–4%, thus providing an observed efficiency of 84–85%, compared with 81% without borate. The true efficiency of causticizing sulfide-containing solutions in the presence of borate may actually be above 85%, but may be suppressed due to limitations of the analytical procedures used to analyze the solutions (see Example 3). Even at the very low B/Na molar ratio of 0.0036:1, a slight improvement in causticizing efficiency is observable.

In solutions which do not contain sulfide, the presence of borate can increase the causticizing efficiency by as much as 8%. At B/Na molar ratios in the range of between about 0.003:1 and 0.33:1, causticizing efficiencies in the range of 88–90% can be achieved and at the very low B/Na molar ratio of 0.0016:1, a causticizing efficiency of 87% has been achieved, compared with an efficiency of 83% in the absence of borate.

Therefore, the method of this invention can be carried out either in the presence of or in the absence of sulfide, at boron to sodium molar ratios (B/Na) in the range of between about 0.001:1 and 0.4: 1, preferably in the range of between about 0.003:1 and 0.33:1, and more preferably in the range of between about 0.01:1 and 0.3:1.

If the borate is added as a solid it can be dissolved in water or aqueous process liquor, such as green or white liquor, or black liquor prior to combustion in the recovery boiler. It is preferred to add the borate to green liquor prior to lime causticization rather than to white liquor after causticization in order to get the immediate benefit with respect to improved causticizing efficiency and to avoid lowering the alkalinity of the white liquor prior to beginning the pulp digestion process. Mixing may be required in order to ensure complete dissolution if borate is added as a solid. Dissolution problems can be minimized by selection of a fast dissolving borate. In particular, dissolution rate is generally faster if a fine particle size borate is used and some forms of borate dissolve more rapidly than others. For example, sodium tetraborate decahydrate dissolves more rapidly in water than anhydrous sodium tetraborate.

The method of this invention is carried out in aqueous solution, such as using green liquor in a conventional pulping operation. The causticizing reaction may be carried out using reaction times and temperatures which are typical of conventional lime causticizing operations. Typically, high temperature molten smelt from the recovery boiler is added directly to water or process liquors to produce hot green liquor which is fed to the lime causticization process. As a result, the temperature at which the causticization reaction takes place is generally dependent on other process conditions. Reaction temperatures in the range of about 80–100° C. are typical in commercial operations.

While the method of this invention may provide some minor improvement in the kinetics of the causticizing reaction, it is anticipated that reaction times which would be utilized are about the same as for the conventional lime causticization process in the absence of borate. One of the beneficial aspects of applying the method of this invention to an existing lime causticization operation is that it does not require any process modifications with regard to reaction time or temperature.

The improved causticizing efficiency provided by the method of this invention will benefit the pulp mills in a variety of ways. In a pulping process whose production rate is limited by the capacity of the lime recovery circuit, the method of this invention may be used to increase the overall production by increasing the capacity of the causticization plant. In processes where the capacity of the causticization plant and lime recovery circuit do not limit the overall pulping process production rate the main effect of increased causticizing efficiency in a alkaline pulp mill occurs through a reduction in the carbonate dead load recirculating around the pulping and recovery cycle. An increase in causticizing efficiency from 81% to 89% results in a 46% reduction in the carbonate dead load. This has many beneficial effects as discussed below.

In the pulping operation, the lower carbonate dead load in the white liquor reduces the tendency to form $CaCO_3$ scales on screens and heat exchangers in the continuous digesters. These scales have a major effect on digester capacity and require occasional shutdowns for cleaning. The amount of sodium carbonate in the black liquor is reduced from about 6–6.5% to 3.2–3.5%. This reduces the tendency to form $CaCO_3$ scales in the evaporators, commonly a major problem with hardwood liquors due to excess carbonate in the liquor.

The critical solids content of the black liquor (the concentration at which sulfate-carbonate precipitation begins) increases by several percent, likely to the mid-50% range, as a result of the reduced carbonate dead load. This is especially beneficial in evaporator systems using LTV (long tube vertical) evaporators to achieve solids contents of about 50% before sending the liquor to a concentrator or direct contact evaporator. It also reduces problems with sludge formation in direct contact evaporators as well as the tendency for scale formation in concentrators, especially at very high solids levels, since the point where carbonate itself precipitates out (as opposed to co-precipitating with sulfate) is moved to higher solids. This is one of the main current problems in fouling of high solids concentrators.

The reduced sodium carbonate concentrations in the black liquor will lower the boiling point rise of the liquor. For the same steam pressure to the first effect, this results in higher delta T's for the evaporators (the difference between the boiling point of the actual solution and the boiling point of water) and hence increased capacity. This effect alone will increase evaporator capacity by 5–10%. There is also an increase in the steam efficiency of the recovery boiler. One reason is that for the same firing solids content, less water enters the boiler. At 70% solids, the reduced water input will result in a steam efficiency increase of about 0.2% on an absolute basis or 0.3% on a relative basis. Smelt flow is also reduced by about 7% resulting in a slightly higher increase in steam efficiency. All together, a relative increase in steam production of 0.6–0.7% should be obtained. An even greater gain is possible if the reduction in carbonate dead load allows higher solids liquor to be obtained from the evaporators.

There is a 3% reduction in the total amount of liquor solids per ton of pulp, a 6–7% reduction in the sodium input per ton of pulp, and about a 200 Btu/lb increase in the liquor heating value. This provides many benefits in the recovery boiler. For example, many recovery boilers have permit limits on the amount of liquor solids which can be burned. In this case, the reduction in liquor solids per ton of pulp can be used to obtain a 3% increase in pulp production. The higher heating value will allow the liquor to burn more easily and with a hotter lower furnace. This results in lower $SO_2$ losses, decreased corrosion problems in the generating bank and economizer, and less plugging from sticky dust.

The 6–7% reduction in the inorganic in the liquor fired into the boiler results in less ash in carryover. This could result in reduced plugging rates for the recovery boiler. There is also 6–7% less smelt flow to the dissolving tank, so for the same green liquor TTA (total titratable alkali) there is 6–7% less volumetric throughput through the green and white liquor system. For the same caustic production, this provides longer retention times in slakers, causticizers and clarifiers, and probably better separation efficiencies for dregs and lime mud. Lime mud would likely be easier to wash and dewater, which in turn reduces fuel requirements for the lime kiln. The extent of this is difficult to quantify. For those mills where clarifier capacity is the production limit, the reduced volumetric throughput could be used to achieve a corresponding increase in caustic production.

The greatest benefits of reduced deadload are found at low levels of borate addition since this is the range in which the reduction of unreacted sodium carbonate in the circuit due to improved causticizing efficiency exceeds the increased load in the circuit as a result of the borate added. This region of minimum deadload occurs when causticizing efficiency is at its maximum, such as at boron to sodium molar ratios above about 0.003:1, and when the boron to sodium molar ratio is low. The level at which the added load due to the presence of boron begins to exceed the reduction in sodium carbonate deadload as a result of improved causticizing efficiency will vary from one pulp mill to another, depending on the specific conditions at each mill. It is estimated that in a typical mill this level may occur at a boron to sodium molar ratio of about 0.06:1. At higher boron to sodium ratios the increased load due to the presence of boron in the circuit exceeds the decrease in the sodium carbonate deadload resulting from improved causticizing efficiency.

Increased causticizing efficiency also provides certain chemical savings. During the transition period from low causticizing efficiency to high causticizing efficiency operation, there is a depletion in the sodium carbonate inventory in the entire cycle as a large part of it is gradually converted to caustic. This continues until a new steady-state is reached. This reduces demand for sodium makeup input in the transition period. The extent of this benefit depends on the amount of dead load carbonate that exists in the entire cycle at the start of the transition.

Since there is less inorganic chemical circulating with the pulp under steady-state conditions, chemical losses are reduced for the same pulp washing efficiency. The amount of sodium circulating around the system is reduced by 6–7% and washing losses are reduced in proportion.

Increased causticizing efficiency does not, by itself, result in greater caustic production if calciner capacity is a production limit, since one lime molecule (CaO) is required for each 2NaOH produced, the CaO ending up as $CaCO_3$. However, there will be a reduction in the lime requirements (or a potential gain in throughput for a calciner limited mill) if the higher causticizing efficiency results in less $Ca(OH)_2$ in the lime mud. $Ca(OH)_2$ ends up in the lime mud when the lime dosage is greater than needed for the conversion of carbonate that occurs. This is referred to as overliming. Thus there could be a production gain in a calciner limiting situation if overliming is reduced.

EXAMPLES

The following examples illustrate the method of this invention.

Example 1

A series of laboratory experiments was run using the following starting chemicals and test procedures to evaluate the effect of borate on causticizing efficiency.

Starting Chemicals
- $Na_2CO_3$ solution: 205.2 grams of $Na_2CO_3$ per litre (or 120 g/L as $Na_2O$)
- $Na_2B_2O_4$ solution: 254.7 grams of $Na_2B_2O_4 \cdot 4H_2O$ per litre (or 200 g/L as $Na_2B_2O_4$)
- $BaCl_2$ solution: 160 grams of $BaCl_2 \cdot 2H_2O$ per litre
- Lime: Prepared by calcining pure $CaCO_3$ at 950° C. for 1 hour.

Procedure
1. Mix 50 ml of $Na_2CO_3$ solution with a desired volume of $Na_2B_2O_4$ solution in a beaker to produce a borate-containing $Na_2CO_3$ solution of a desired B/Na molar ratio (Solution A).
2. Stir and heat the Solution A on the hot plate and control the solution temperature at about 80° C.
3. Add 5.41 grams of lime to the Solution A to make the $CaO:Na_2CO_3$ molar ratio equal to 1:1.
4. Stir the mixture continuously and maintain the temperature in the range of 80–90° C. for various lengths of time.
5. Filter the resulting mud ($CaCO_3$ precipitate), wash it with 100 ml of hot water, and dry the clean mud in an oven at 150° C. for 24 hours.
6. The filtrate from step 5 (Solution B) was analyzed for unreacted $Na_2CO_3$ and the causticizing efficiency (CE) was determined according to the following procedures.

Unreacted $Na_2CO_3$ Analysis and CE Determination
1. Add 50 ml of $BaCl_2$ solution into the Solution B obtained the above procedure, to precipitate the unreacted $CO_3^{2-}$ ions as $BaCO_3$.
2. Filter the $BaCO_3$ precipitate, dry it in an oven and weigh the dried mass.
3. Add additional 10 ml of $BaCl_2$ to the filtrate to ensure that all $CO_3^{2-}$ ions have been removed.
4. Calculate the unreacted $Na_2CO_3$ in the Solution B based on the amount of $BaCO_3$ precipitate.
5. Calculate the CE using the following equation:

$$CE = \frac{[Na_2CO_3]_{Solution\ A} - [Na_2CO_3]_{Solution\ B}}{[Na_2CO_3]_{Solution\ A}} \times 100\%$$

Results

Table 1 and FIG. 2 show the causticizing efficiency of two sulfide-free $Na_2CO_3$ solutions after they have been causticized at 80–90° C. for various lengths of time. One solution contained no borate (B/Na molar ratio=0) and the other contained borate at an overall B/Na molar ratio of about 0.33.

TABLE 1

Effect of Reaction Time on Causticizing Efficiency in Sulfide-Free Sodium Carbonate Solutions Analyzed by the $BaCl_2$ Precipitation Method

| Ratio | Reaction Time (minutes) | | |
|---|---|---|---|
| B/Na | 30 | 60 | 120 |
| 0 | 79.5 | 81.5 | 80.1 |
| 0.33 | 87.6 | 89.6 | 85.9 |

The results show that the reaction time has relatively little effect on causticizing efficiency for times in the range of about 30 to 120 minutes. The solution with no borate achieved a causticizing efficiency of about 80–81% over this range of times while the borate-containing solution yielded causticizing efficiencies in the range of about 86–89%. This example also shows a significant increase in causticizing efficiency of about 6–8% due to the presence of borate.

Example 2

Two series of laboratory experiments were run to evaluate the effect of boron loading, measured as the boron to sodium molar ratio, on causticizing efficiency. The reaction procedures were same as in Example 1, with a reaction time of 60 minutes (step 4 in the Procedure) used in all experiments. As in Example 1, sulfide-free solutions of sodium carbonate were used in these experiments. The results from the first series of experiments, run at B/Na molar ratios between 0 and 0.33:1, were analyzed using the same barium chloride precipitation method as was described in Example 1 (see Table 2). The results from the second series of experiments (Table 3), run at B/Na molar ratios between 0 and 0.1:1, were analyzed using the ABC method (described in "Analysis of Sulphate Green and White Liquors", Standard method J.12, Canadian Pulp and Paper Association, Technical Section, June 1961). The results for both series of experiments are summarized in FIG. 3.

TABLE 2

Effect of B/Na Ratio on Causticizing Efficiency in Sulfide-Free Sodium Carbonate Solutions Analyzed by the $BaCl_2$ Precipitation Method

| Molar Ratio B/Na | Causticizing Efficiency (%) |
|---|---|
| 0 | 83.0* |
| 0.0016 | 86.9 |
| 0.0045 | 90.8 |
| 0.0078 | 89.5* |
| 0.065 | 88.4 |
| 0.10 | 88.2 |
| 0.17 | 88.1 |
| 0.33 | 89.0* |

(*average for multiple tests)

TABLE 3

Effect of B/Na Ratio on Causticizing Efficiency
in Sulfide-Free Sodium Carbonate Solutions
Analyzed by the ABC Method

| Molar Ratio B/Na | Causticizing Efficiency (%) |
|---|---|
| 0 | 83.8* |
| 0.0033 | 88.9 |
| 0.0067 | 88.9* |
| 0.0078 | 88.5 |
| 0.017 | 88.4 |
| 0.023 | 90.0 |
| 0.033 | 88.6 |
| 0.1 | 89.1* |

(*average for multiple tests)

Tables 2 and 3 and FIG. 3 show the causticizing efficiency of $Na_2CO_3$ solutions causticized at 80 to 90° C. for 1 hour, as a function of B/Na molar ratio. The causticizing efficiency increased abruptly even at very low levels of borate addition, such as in the range of B/Na molar ratios between about 0.001:1 and 0.003:1, and to maintain high levels of efficiency up to molar ratios of at least 0.33:1. The improvement in causticizing efficiency was typically about 5–6%, the CE increasing from 83–84% without borate to 88–89% with borate. The determination of reliable causticizing efficiencies at a higher B/Na ratios was inhibited by difficulties in analyzing the solutions at these higher levels.

Example 3

A series of tests similar to Example 2 was conducted using green liquor prepared from a kraft smelt (containing 65.7 weight percent $Na_2CO_3$ and 34.25 weight percent $Na_2S$) in place of the synthetically prepared sodium carbonate solution. The results (analyzed by the $BaCl_2$ Method) are shown in Table 4 and FIG. 4.

TABLE 4

Effect of B/Na Ratio on Causticizing Efficiency
in Sulfide-Containing Sodium Carbonate Solutions
Analyzed by the $BaCl_2$ Precipitation Method

| Molar Ratio B/Na | Causticizing Efficiency (%) |
|---|---|
| 0 | 80.9* |
| 0.0036 | 81.9* |
| 0.014 | 85.1* |
| 0.091 | 84.4 |
| 0.231 | 84.2 |
| 0.314 | 83.6 |

(*average for multiple tests)

As in the previous examples, the results of these tests on sulfide-containing green liquor produced from kraft smelt also showed significant increases in causticizing efficiency at a B/Na molar ratios of up to 0.3:1 or higher. The observed improvement in causticizing efficiency with the sulfide-containing green liquor was about 4%, increasing from 81% without borate to 85% at a B/Na molar ratio of 0.014:1. This is a somewhat smaller increase in the causticizing efficiency than was observed with the sulfide-free solutions. However, the lower level of improvement in the causticizing efficiency it the presence of sulfide may be an artifact of the analytical method used in the experiment. $BaCl_2$ precipitates not only $CO_3^{2-}$ ions, but also $SO_4^{2-}$ ions. In the presence of borate, $BaC_2$ also causes some $S^{2-}$ ions to precipitate, resulting in a higher yield of precipitate and a lower calculated causticizing efficiency value.

The above examples indicate that adding even a small amount of borate to alkali pulping liquors can provide a significant increase, on the order of 4–8%, in causticizing efficiency. The method of this invention is applicable to a variety of alkali-based processes including chemical and semi-chemical pulping of wood and processes in which generally sodium hydroxide is or could be regenerated by causticization with lime in connection with the pulping, bleaching or oxidation of cellulose-based materials. Accordingly, various modifications and changes of the invention can be made and, to the extent that such variations incorporate the spirit of this invention, they are intended to be included within the scope of the appended claims.

What is claimed is:

1. A method for causticizing sodium carbonate in an alkaline pulping process comprising reacting an aqueous solution from said alkaline pulping process which solution includes (i) sodium carbonate, (ii) an amount of lime effective to causticize the sodium carbonate to form sodium hydroxide, and (iii) borate in an amount sufficient to achieve a boron to sodium molar ratio of between about 0.003:1 and 0.06:1 and form said sodium hydroxide at an increased causticizing efficiency rate as compared to the causticizing efficiency rate when borate is not present in the aqueous solution.

2. The method according to claim 1 wherein said borate is added in the form of sodium borate.

3. The method according to claim 2 wherein said sodium borate is sodium metaborate.

4. The method according to claim 2 wherein said sodium borate is sodium tetraborate.

5. The method according to claim 4 wherein said sodium tetraborate is sodium tetraborate pentahydrate.

6. The method according to claim 5 wherein the molar ratio of boron to sodium is at least about 0.01:1.

7. The method according to claim 6 wherein said pulping process further comprises pulp bleaching.

8. The method according to claim 6 wherein said process is a non-wood fiber pulping process.

9. The method according to claim 6 wherein said process is a kraft pulping process.

10. The method according to claim 6 wherein said process is a soda pulping process.

11. The method according to claim 1 wherein the molar ratio of boron to sodium is at least about 0.01:1.

12. The method according to claim 1 wherein said pulping process further comprises pulp bleaching.

13. The method according to claim 1 wherein said process is a non-wood fiber pulping process.

14. The method according to claim 1 wherein said process is a kraft pulping process.

15. The method according to claim 1 wherein said process is a soda pulping process.

* * * * *